(12) United States Patent
Mihara

(10) Patent No.: US 9,045,036 B2
(45) Date of Patent: Jun. 2, 2015

(54) CAP ATTACHING STRUCTURE

(75) Inventor: Kenta Mihara, Yokohama (JP)

(73) Assignee: Piolax, Inc., Yokohama-shi, Kanagawa (JP)

( * ) Notice: Subject to any disclaimer, the term of this patent is extended or adjusted under 35 U.S.C. 154(b) by 191 days.

(21) Appl. No.: 13/884,908

(22) PCT Filed: Nov. 8, 2011

(86) PCT No.: PCT/JP2011/075693
§ 371 (c)(1),
(2), (4) Date: May 10, 2013

(87) PCT Pub. No.: WO2012/063808
PCT Pub. Date: May 18, 2012

(65) Prior Publication Data
US 2013/0233852 A1 Sep. 12, 2013

(30) Foreign Application Priority Data

Nov. 12, 2010 (JP) ................. 2010-253433

(51) Int. Cl.
*F16K 24/04* (2006.01)
*B60K 15/01* (2006.01)
(Continued)

(52) U.S. Cl.
CPC ....... *B60K 15/01* (2013.01); *B60K 2015/03467* (2013.01); *B60K 15/03519* (2013.01);
(Continued)

(58) Field of Classification Search
CPC ..... F16K 24/04; F16K 24/042; F16K 24/044; F16K 24/046; B60K 2015/034467; B60K 15/03549

USPC ............... 137/43, 202, 315.33; 251/357, 360, 251/361, 366, 367; 141/198; 220/913, 745, 220/254.8, 254.1, 325, 324, 326, 315, 212; 215/228, 357, 356, 355, 364, 281, 282, 215/283, 280, 273, 329, 316
See application file for complete search history.

(56) References Cited

U.S. PATENT DOCUMENTS

| 2003/0141304 A1* | 7/2003 | Franjo et al. ............. 220/562 |
| 2005/0051563 A1 | 3/2005 | Yamada |

(Continued)

FOREIGN PATENT DOCUMENTS

| CN | 101487539 A | 7/2009 |
| CN | 101713358 A | 5/2010 |

(Continued)

OTHER PUBLICATIONS

International Search Report in PCT/JP2011/075693 dated Feb. 7, 2012(English Translation Thereof).
(Continued)

*Primary Examiner* — Eric Keasel
*Assistant Examiner* — Ian Paquette
(74) *Attorney, Agent, or Firm* — McGinn IP Law Group, PLLC

(57) ABSTRACT

A cap attaching structure includes a cylindrical member and a cap member. The cylindrical member has an end plate, a side wall to be inserted into the cylindrical member, and an engagement claw piece in which a proximal end portion is connected to an inserting side end portion of the side wall, while a distal end portion extends towards the end plate via a slit. On an outer circumference of the engagement claw piece, a claw portion adapted to be brought into engagement with an engagement hole of the cylindrical member is provided. The distal end portion of the engagement claw piece is disposed in a cutout portion in the end plate.

4 Claims, 6 Drawing Sheets

(51) Int. Cl.
  *F02M 37/00* (2006.01)
  *F02M 37/10* (2006.01)
  *F16K 24/06* (2006.01)
  *B60K 15/03* (2006.01)
  *B60K 15/035* (2006.01)

(52) U.S. Cl.
  CPC ......... *F02M37/0023* (2013.01); *F02M 37/103* (2013.01); *F16K 24/044* (2013.01); *F16K 24/06* (2013.01); *B60K 15/035* (2013.01)

(56) References Cited

U.S. PATENT DOCUMENTS

| | | | |
|---|---|---|---|
| 2005/0092364 A1 | 5/2005 | Furuya et al. | |
| 2005/0126633 A1* | 6/2005 | Leonhardt | 137/202 |
| 2009/0084449 A1* | 4/2009 | Matsuo | 137/409 |
| 2010/0108155 A1* | 5/2010 | Kobayashi et al. | 137/202 |
| 2014/0319160 A1* | 10/2014 | Sato | 220/787 |

FOREIGN PATENT DOCUMENTS

| | | |
|---|---|---|
| JP | 59-171255 | 11/1984 |
| JP | 3-65062 | 6/1991 |
| JP | 4-110208 | 9/1992 |
| JP | 6-10613 | 2/1994 |
| JP | 2002-283929 A | 10/2002 |
| JP | 2005-083249 A | 3/2005 |
| JP | 4017587 B2 | 12/2007 |

OTHER PUBLICATIONS

Chinese Office Action dated Mar. 30, 2015 with an English translation thereof.

* cited by examiner

CAP ATTACHING STRUCTURE

TECHNICAL FIELD

The present invention relates to a cap attaching structure for attaching a cap member to an opening portion of a cylindrical member.

BACKGROUND ART

In general, cylindrical members having a circularly cylindrical or angularly cylindrical shape are widely used. And, a cap member may be attached to an opening portion of such cylindrical member. Further, a slidable member, a spring and the like may be accommodated within such cylindrical member.

For example, Patent Literature 1 describes a plate material fixture. The plate material fixture includes a main member, a holding member, an operation member and a lock member, thereby fixing a plate material to an attaching base body by making use of a spherical boss portion provided on the attaching base body. The main member has a cylindrical main body that is to be fixed to the plate material. The cylindrical main body accommodates the lock member so as to move vertically, and also accommodates a spring member for biasing the lock member. The operation member is attached detachably to an opening portion of the cylindrical main body.

The operation member has an operation head body which covers the opening portion of the cylindrical main body and four leg pieces which are suspended from a lower surface of the operation head body at uniform intervals. On outer sides of distal ends of an opposing pair of the four leg pieces, stopper projections are provided individually. On the other hand, a pair of opposing elongated guide holes are provided in the cylindrical main body of the main member.

When assembling the operation member to the cylindrical main body, the operation member is pushed into the cylindrical main body after the operation member is positioned relative to the cylindrical main body by aligning the pair of stopper projections with the pair of elongated guide holes. Then, the stopper projections at the distal ends of the leg pieces are pressed against an inner circumference of the cylindrical main body, whereby the leg pieces are deflected inwards on distal end portions (portions close to the operation head body) of the cylindrical main body as fulcrums. When the stopper projections reach the elongated guide holes, the leg pieces are elastically restored, and the stopper projections enter the elongated guide holes, whereby the operation member is attached slidably to the cylindrical member.

A valve system which is attached to a fuel tank of a vehicle may also employ the structure in which some member is accommodated in the cylindrical member and the cap member is attached to the opening of the cylindrical member.

For example, Patent Literature 2 describes a check-valve-integrated cut valve. The check-valve-integrated cut valve includes a main body case that accommodates a float valve and that has a vent hole formed in an upper wall so as to be opened and closed by the float valve, an upper case that is fittingly secured to an upper portion of the main body case and has a connection pipe projecting from an outer wall thereof and communicating with the vent hole, a cylindrical portion that elects from the upper wall of the main body case around the vent hole, a check valve that is disposed within the cylindrical portion so as to move vertically, a spring that biases the check valve towards the vent hole in the upper wall, and a lid member that is attached to an upper end opening portion of the cylindrical portion.

An annular projecting portion is provided around an outer circumference of the lid member, and an annular recess portion is formed in an inner circumference of an upper end portion of the cylindrical portion. When the lid member is pushed into the opening portion after a circumferential wall of the lid member is aligned with a circumferential edge of the opening portion of the cylindrical portion, the upper end portion of the cylindrical portion which is separated partially by notched portions are elastically opened outwards. Further, when the annular projecting portion reaches the annular recess portion, the upper end portion of the cylindrical portion is elastically restored, allowing the annular projecting portion to fit in the annular recess portion, whereby the lid member is attached to the upper end opening portion of the cylindrical portion.

PRIOR ART LITERATURE

Patent Literatures

Patent Literature 1: JP-UM-H04-110208-A
Patent Literature 2: JP-4017587-B

SUMMARY OF THE INVENTION

Problems that the Invention is to Solve

In the plate material fixture of Patent Literature 1, the stopper projections are provided on the outer sides of the distal end portions of the leg pieces of the operation member. Thus, when the operation member is positioned relative to the cylindrical main body such that the leg pieces are aligned with the elongated guide holes, it is difficult for the distal end portions of the leg pieces to be inserted into the opening portion of the cylindrical main body. If the posture of the operation member is not stabilized and the loosening of the operation member is produced, it becomes difficult to push the operation member into the opening portion.

Additionally, when the operation member is pushed into the opening portion, the stopper projections are pressed against the inner circumference of the cylindrical main body, whereby the leg pieces are deflected inwards on the proximal end portions thereof as fulcrums. Therefore, an inclined angle of outer surfaces of the stopper projections with respect to a circumferential wall of the cylindrical main body is increased, resulting in an increased insertion resistance of the operation member, and the attaching work may become difficult. Further, if the leg pieces are deflected excessively inwards due to the inclination of the pushing force at the time of insertion, the failure of the leg pieces may occur.

On the other hand, in the case of the check-valve-integrated cut valve of Patent Literature 2, since the annular recess portion is provided in the inner circumference of the upper end portion of the cylindrical portion, during the injection molding, it is necessary to "forcibly remove" a mold which defines an inner shape of the cylindrical portion along an axial direction of the cylindrical portion in order to form the annular recess portion. As this occurs, the annular recess portion may be scraped by the mold, thereby decreasing the dimensional accuracy of the annular recess portion. Thus, the lid member may not be attached firmly. Further, the annular recess portion of the cylindrical portion should not be formed deep for facilitating the removal of the mold, whereas the annular projecting portion of the lid member should not project largely for suppressing the insertion resistance of the lid member. Thus, the engaging force of the annular projecting portion with the annular recess portion may be decreased.

Thus, an object of the invention is to provide a cap attaching structure that can improve the attaching work of a cap member while decreasing an insertion resistance of the cap member against a cylindrical member, thereby preventing the failure of the cap member and realizing the strong and rigid attachment of the cap member to an opening portion of the cylindrical member.

Means for Solving the Problem

To attain the object, the invention provides a cap attaching structure including:
a cylindrical member; and
a cap member which is attached to an opening portion of the cylindrical member,
wherein the cylindrical member has an engagement hole in a circumferential wall at a position close to the opening portion thereof,
wherein the cap member includes:
an end plate which is disposed in the opening portion;
a side wall which extends from a circumferential edge of the end plate so as to be inserted into the cylindrical member; and
an engagement claw piece which has
a proximal end portion which is connected to an inserting side end portion of the side wall,
a distal end portion which extends from the proximal end portion towards the end plate via a slit formed in the end plate and the side wall so as to constitute a free end, and
a claw portion which is formed on an outer circumference of the engagement claw piece so as to be brought into engagement with the engagement hole of the cylindrical member, and
wherein the distal end portion of the engagement claw piece is disposed in a cutout portion in the end plate via the slit, so that a deflection of the engagement claw is restricted through an abutment with the cutout portion in the end plate.

The invention may provide the cap attaching structure, wherein a cutout recess portion is formed in an opening side circumferential edge of the cylindrical member, and
wherein a projecting piece is provided on an outer circumference of the end plate of the cap member so as to fit in the cutout recess portion.

The invention may provide the cap attaching structure, wherein the cylindrical member constitutes a cylindrical wall portion which defines a check valve accommodating portion of a check-valve-integrated cut valve, the check valve accommodating portion being provided continuously on an upper surface of a main body case, the main body case accommodating a float valve, and
wherein the cap member is attached to the cylindrical member so as to fasten one end of a spring which biases the check valve towards a vent hole formed in the upper surface.

Advantage of the Invention

According to the invention, the proximal end portion of the engagement claw piece is connected to the distal end side of the side wall which extends from the end plate, and the claw portion projects from the outer circumference thereof. Therefore, when the inserting end portion side of the side wall of the cap member is pushed into the opening portion of the cylindrical member after the circumferential position of the claw portion on the engagement claw piece is aligned with the engagement hole of the cylindrical member, the distal end portion of the side wall of the cap member enters the opening portion of the cylindrical member, the claw portion is brought into engagement with the circumferential edge of the opening portion of the cylindrical member, whereby the cap member can be held temporarily in the cylindrical member.

By further pushing the cap member into the cylindrical member, the claw portion is pressed on by the inner circumference of the cylindrical member, whereby the engagement claw piece is deflected on the proximal end portion as a fulcrum. Then, after the claw portion reaches the engagement hole, the engagement claw piece is elastically restored, and the claw portion is brought into engagement with the engagement hole, whereby the cap member can be attached to the opening portion of the cylindrical member.

In this structure, when inserting the cap member into the cylindrical member, the distal end portion of the side wall of the cap member is inserted into the cylindrical member so that the cap member can be held temporarily therein without loosening and in a stable fashion. Therefore, the cap member can be pushed in easily, thereby improving the attaching work of the cap member.

When pushing the cap member into the cylindrical member, even when the engagement claw piece is deflected inwards largely, the distal end portion thereof is brought into abutment with the cutout portion in the end plate, whereby the engagement claw piece is restricted from being deflected further, thereby preventing the failure of the engagement claw piece.

When further pushing the cap member into the cylindrical member such that the claw portion is brought into abutment with the inner circumference of the cylindrical member, the engagement claw piece is deflected inwards on the proximal end portion which is connected to the inserting end portion side of the side wall of the cap member as a fulcrum. Therefore, the angle of the outer surface of the claw portion with respect to the circumferential wall of the cylindrical member is decreased as the cap member is pushed in, and therefore, the insertion resistance of the cap member can be decreased, thereby improving the attaching work of the cap member.

Since, the inclination angle of the outer surface of the claw portion can be decreased to thereby decrease the insertion resistance of the cap member when the engagement claw piece of the cap member is deflected inwards, the claw portion which projects from the outer circumference of the engagement claw piece can be formed relatively high to thereby increase the engaging force with the cylindrical member, whereby the cap member can be attached surely to the cylindrical member. Further, since the engagement hole with which the claw portion on the engagement claw piece is brought into engagement is formed in the circumferential wall of the cylindrical member, by using a mold which slides in a direction which is at right angles to an axial direction of the circumferential wall, the removal of the mold from the engagement hole can be performed regularly, thereby forming the engagement hole with good accuracy.

MODE FOR CARRYING OUT THE INVENTION

An embodiment of a cap attaching structure of the invention will be described with reference to the drawings. The embodiment will exemplify a check-valve-integrated cut valve in which a cut valve which prevents the leakage of fuel from a fuel tank is integrated with a check valve which adjusts the pressure within the fuel tank as the application target of the invention. The invention may also be applied to, for example, the plate material fixture of Patent Literature 1. The invention can widely be used to attach a cap member to an opening portion of a cylindrical member.

Figure 1:
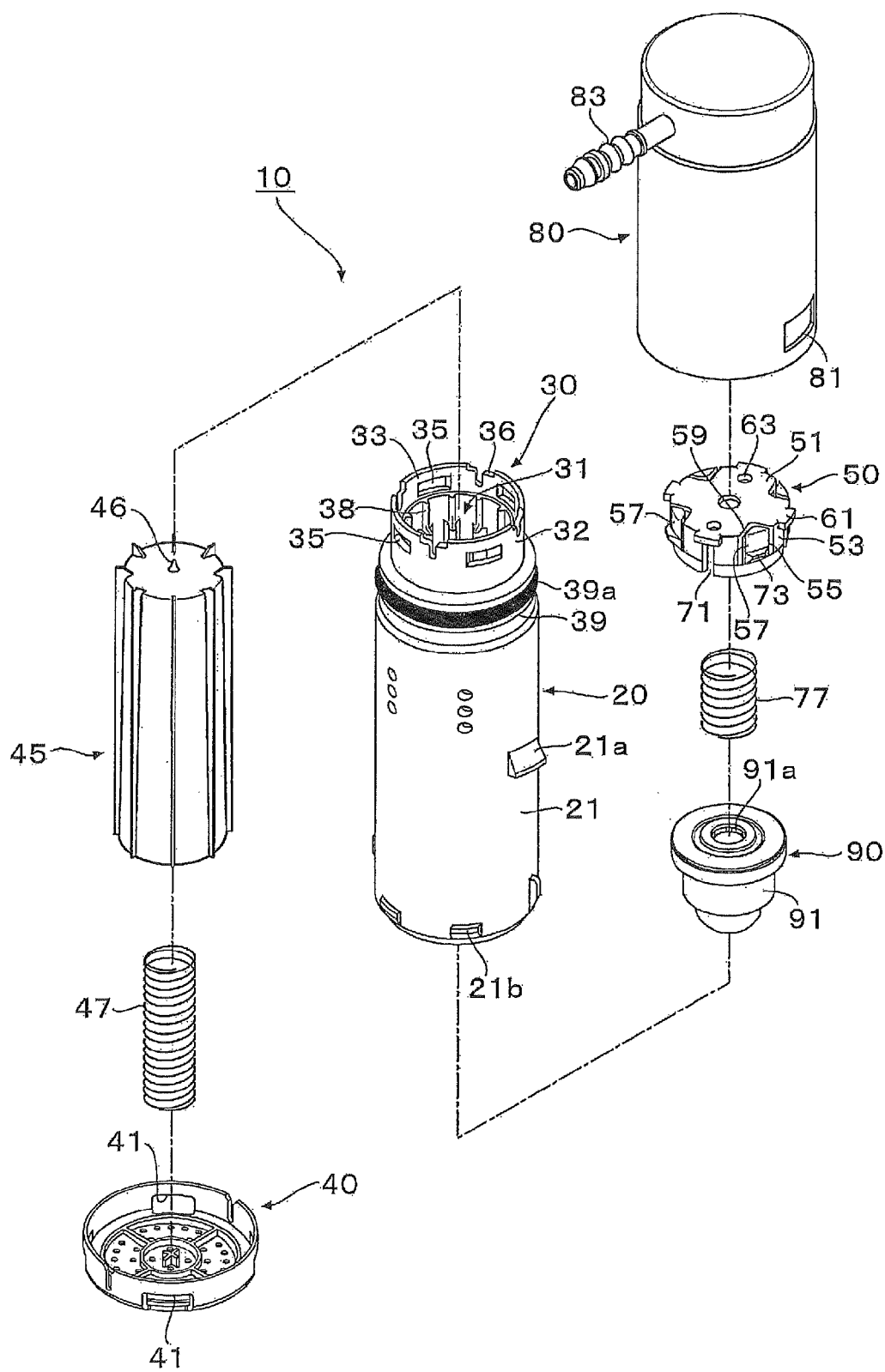
FIG. 1 is an exploded perspective view of a check-valve-integrated cut valve to which a cap attaching structure according to the invention is applied.

As shown in FIG. 1, a check-valve-integrated cut valve 10 of this embodiment has a substantially cylindrical main body case 20, a bottom case 40 which is attached to a lower opening portion of the main body case 20, a float valve 45 which is accommodated within the main body case 20, a float valve spring 47 which biases the float valve 45 upwards, a cap member 50 which is attached to an upper opening in the main body case 20, an outer case 80 which is attached to an outer circumference of the main body case 20, and a check valve 90 which is disposed below the cap member 50 via a spring 77.

Figure 2:
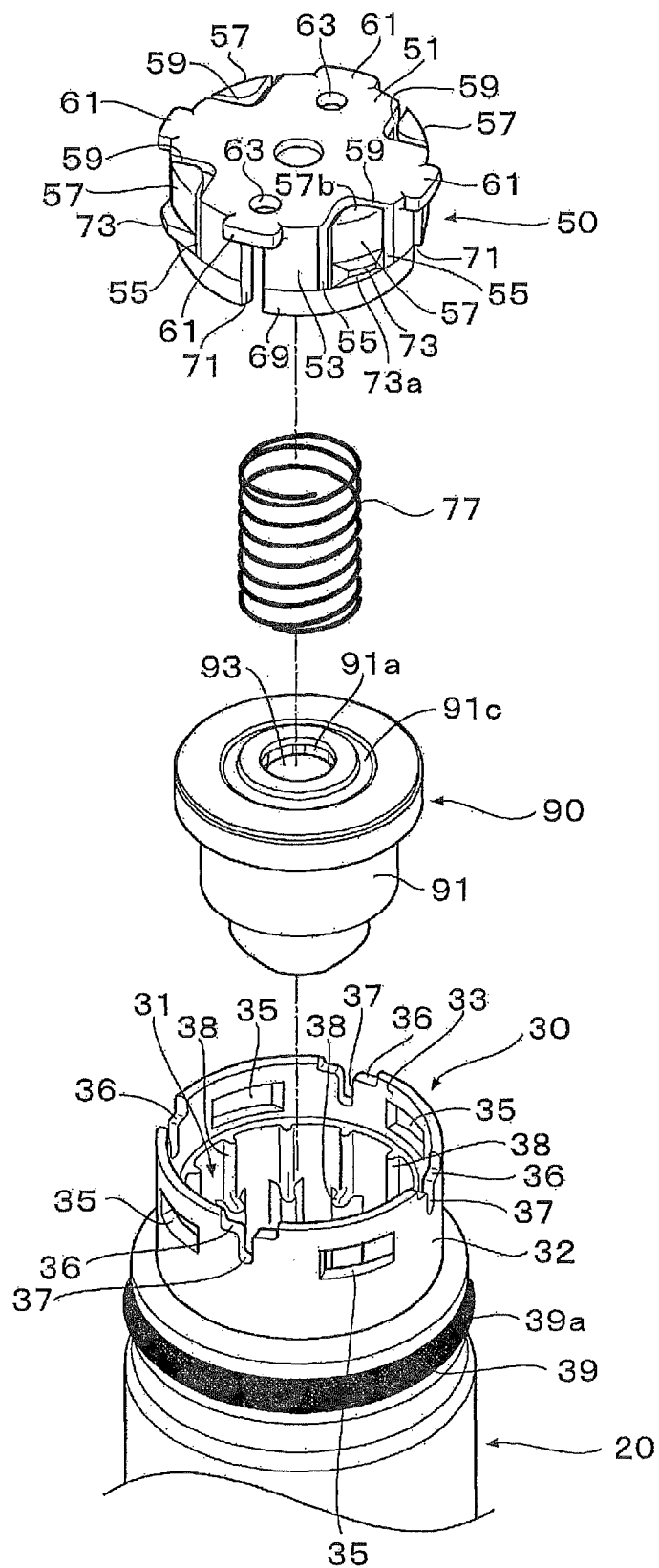
FIG. 2 is a perspective view of a main part of FIG. 1.
Figure 4A:
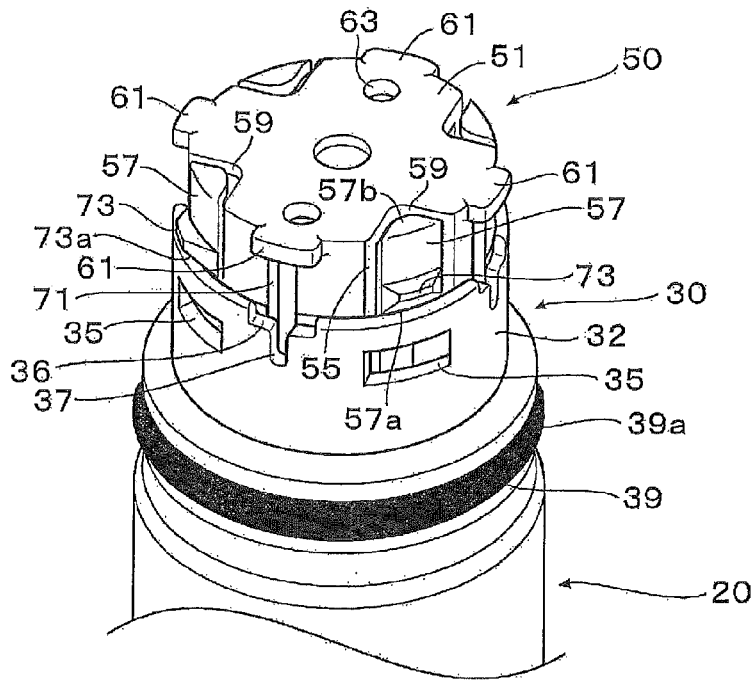
FIG. 4 shows a state in which the cap member is held temporarily to a cylindrical member using the cap attaching structure, in which (a) is an enlarged perspective vie and (b) is an enlarged sectional view of the main part.
Figure 4B:
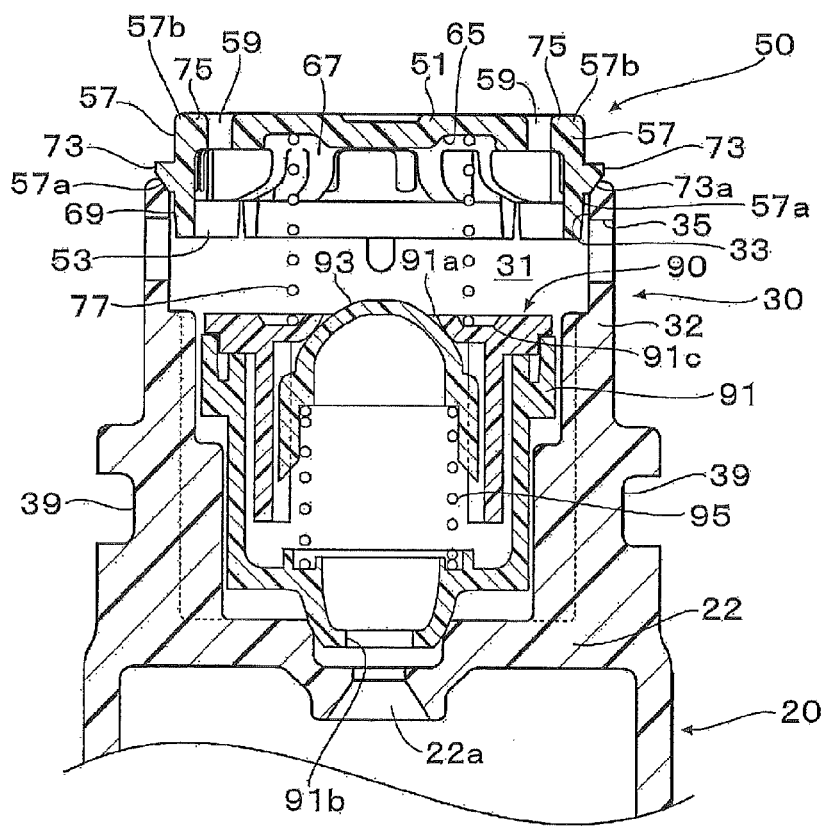

As shown in FIGS. 1, 2 and 4(b), the main body case 20 has a cylindrical outer circumferential surface 21 which is opened at a lower end and is closed at an upper end with an upper surface 22 thereof. A vent hole 22a is formed in a center of the upper surface 22 of the main body case 20. Plural locking projections 21a and plural locking projections 21b are provided on an intermediate outer circumference and a lower outer circumference of the outer circumferential surface 21 of the main body case 20 so as to project therefrom, respectively. The bottom case 40 has a bottomed cylindrical shape, and plural locking holes 41 are formed in an outer circumferential surface thereof. The float valve 45 is placed on a bottom surface of the bottom case 40 via the float valve spring 47, and the locking projections 21b are fitted in the locking holes 41, whereby the bottom case 40 is attached to the main body case 20.

The float valve spring 47 is compressed by the weight of the float valve 45. Although the float valve 45 is normally in abutment with the bottom surface of the bottom case 40, when the level of a fuel within the fuel tank rises so that the float valve 45 is immersed in the fuel to a predetermined height, the float valve 45 rises due to its buoyancy and a biasing force of the float valve spring 47, whereby the vent hole 22a in the upper surface 22 of the main body case 20 is closed by a projection 46 which projects from a center of an upper end of the float valve 45.

As shown in FIGS. 2 and 4(b), in this embodiment, a cylindrical member 30, which makes up the cap attaching structure of the invention, is provided continuously on the upper surface 22 of the main body case 20, and this cylindrical member 30 constitutes a cylindrical wall portion which defines a check valve accommodating portion 31. This cylindrical member 30 erects from an outer circumferential edge of the upper surface 22 of the main body case 20 to have a cylindrical shape of a predetermined height, and has a circumferential wall 32 having a circular opening portion 33 in an upper end thereof.

Plural (in this embodiment, four) elongated engagement holes 35 are formed in a circumferential surface of the circumferential wall 32 in a position close to the opening portion 33 at equal intervals along a circumferential direction of the circumferential wall 32. Plural cutout recess portions 36 are formed in a circumferential edge of the opening portion 33 of the circumferential wall 32 so as to extend a predetermined depth from an upper end thereof. In this embodiment, four cutout recess portions 36 are formed in an upper end portion of the circumferential wall 32 so that each cutout recess portion 36 is positioned between the adjacent two engagement holes 35, 35 (refer to FIG. 2). A notched groove 37 is formed in a center of a bottom portion of each cutout recess portion 36 so as to extend a predetermined depth along an axial direction of the circumferential wall 32.

An annular ring groove 39 is formed in an outer surface of a base portion of the circumferential wall 32 of the cylindrical member 30, and a seal ring 39a is fitted therein.

The cap member 50 is to be attached to the opening portion 33 of the cylindrical member 30. The cap member 50 has an end plate 51 which is disposed in the opening portion 33, a side wall 53 which extends from a circumferential edge of the end plate 51 to be inserted into an inner circumference of the cylindrical member 30, and engagement claw pieces 57 which are formed via slits 55 provided in the end plate 51 and the side wall 53.

Figure 3A:
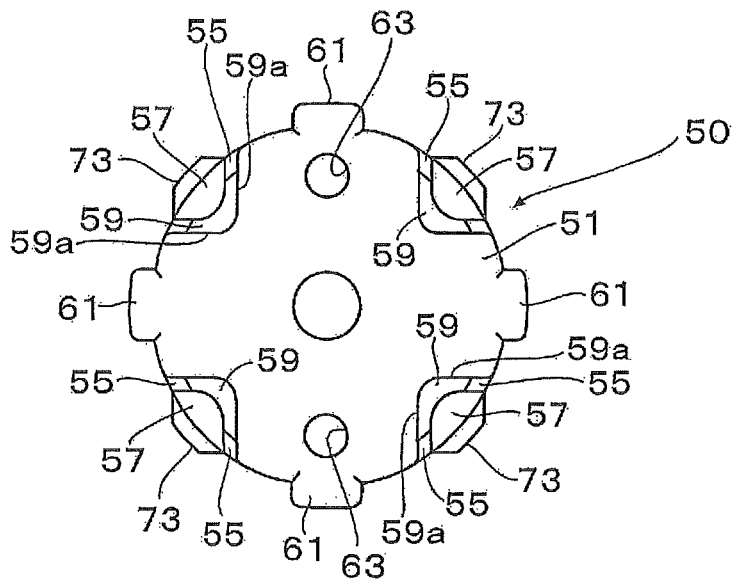
FIG. 3 shows a cap member which makes up the cap attaching structure according to the invention, in which (a) is a plan view, (b) is a front view and (c) is a bottom view of the cap member.

The end plate 51 has a circular shape having an outside diameter which matches the opening portion 33 of the cylindrical member 30. Plural (in this embodiment, four) cutout portions 59 are formed in an outer circumference of the end plate 51, and are disposed circumferentially at predetermined intervals. An inner circumference of the cutout portion 59 makes up a part of the slit 55. As shown in FIG. 3(a), when the cap member 50 is viewed from the top thereof, each cutout portion 59 has a substantially fan shape in which lateral sides 59a, 59a intersect each other at right angles. Projecting pieces 61 are provided on an outer circumference of the end plate 51 so as to project outwards from centers between the adjacent cutout portions 59, 59 so that the projecting pieces 61 fit in the cutout recess portions 36 in the cylindrical member 30. In this embodiment, four projecting pieces 61 are provided so as to correspond to the four cutout recess portions 36. Each projecting piece 61 is formed so wide as to match the width of the cutout recess portion 36.

As shown in FIG. 3(a), a pair of circular through holes 63, 63 are formed in the end plate 51 in positions aligned with the projecting pieces 61 at opposite portions inwardly of a circumferential edge thereof. As shown in FIG. 3(c), a spring support recess portion 65 is formed in a center of a back side of the end plate 51, and plural spring support ribs 67 project from an inner circumference of the back side of the end plate 51. In this embodiment, four pairs of support ribs 67 are provided so as to extend along a circumferential direction of the end plate 51. A distance between the spring support ribs 67 disposed at the portion where the circular through hole 63 is wider than a distance between the spring support ribs 67 disposed at the portion where the through hole 63 is not formed (refer to FIG. 3(c)).

The side wall 53 extends from the circumferential edge of the above-described end plate 51, and has such an outside diameter that the side wall 53 can be inserted into an inner circumference of the circumferential wall 32 of the cylindrical member 30. A tapered surface 69 is formed on an outer circumference of a distal end portion of the side wall 53 so as to gradually decrease in diameter towards the extremity thereof. Notched grooves 71 are formed in the side wall 53 so as to extend along an axial direction of the side wall 53 in positions which are aligned with circumferential centers of the projecting pieces 61. As a result, when the projecting pieces 61 of the cap member 50 are fitted in the cutout recess portions 36 of the cylindrical member 30, the notched grooves 37 of the cylindrical member 30 are aligned with the notched grooves 71 of the cap member 50 (refer to FIGS. 4(a) and 6(a)).

Figure 3B:
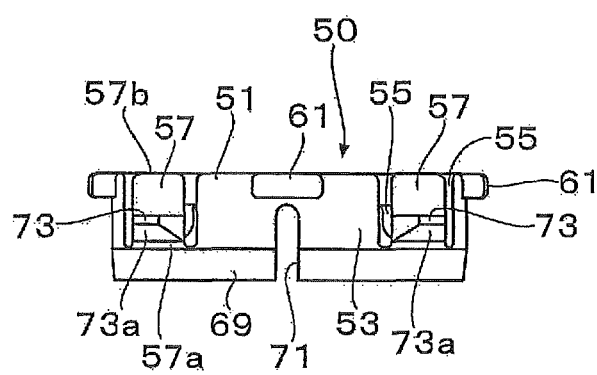
Figure 3C:
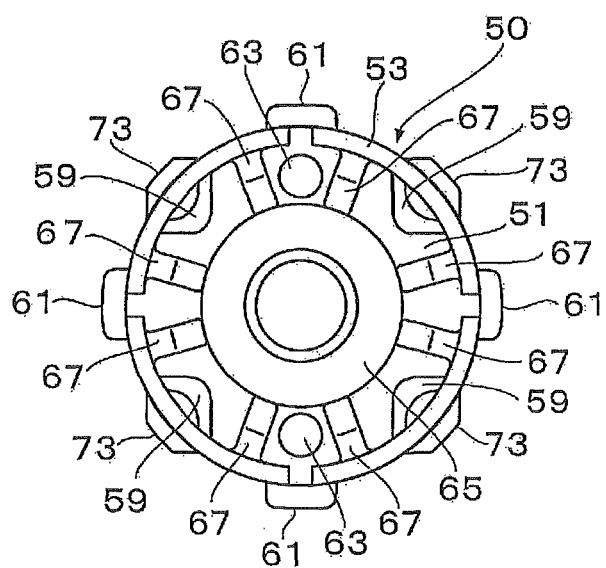

As shown in FIGS. 2 and 3, the slits 55 in this embodiment each includes a pair of straight-line portions that extend from a distal end of the side wall 53 to reach both end portions of the cutout portion 59 and that are disposed parallel and a portion which is formed into a V shape along an inner circumference of the cutout portion 59. In each of the engagement claw pieces 57, a proximal end portion 57a is connected to the end portion of the side wall 53 to be inserted into the cylindrical member 30, and a distal end portion 57b extends towards the end plate 51. The engagement claw pieces 57 are formed so as to be separated from the cap member 50 at other portions than the proximal end portions 57a by the slits 55. In each of the engagement claw pieces 57, the distal end portion 57b extends to a position corresponding to the cutout portion 59 of the end plate 51 and constitutes a free end, whereby the engagement claw piece 57 can be deflected on the proximal end portion 57a as a fulcrum.

A claw portion 73 projects from an outer circumference of each engagement claw piece 57 so as to be brought into engagement with the engaging hole 35 of the cylindrical member 30. An outer surface 73a of a distal end of the claw portion 73 is tapered so that a height of the claw portion 73 is decreased gradually towards the distal end of the side wall 53. An abutment portion 75 projects from an inner circumference of the distal end portion 57b of each engagement claw piece 57. Thus, when the engagement claw piece 57 is deflected inwards, the abutment portion 75 is brought into abutment with the cutout portion 59 of the end plate 51 so that the deflection of the engagement claw piece 57 is restricted (refer to FIG. 5(a)).

As shown in FIG. 1, locking holes 81, 81 are formed on a distal end of an outer circumferential surface of the outer case 80 at opposite positions so as to be engaged with the locking projections 21a of the main body case 20 when the outer case 80 is attached to the outer circumference of the main body case 20. A connection pipe 83, to which piping of various types is connected, projects from the outer circumferential surface of the outer case 80. The outer case 80 may be formed integrally with a pump unit which is disposed within the fuel tank. Or, the outer case 80 may be formed separately from the fuel tank, and then attached to an upper wall thereof. As shown in FIG. 1, when the outer case 80 is placed on the main body case 20 from thereabove, and the locking projections 21a of the main body case 20 are brought into engagement with the locking holes 81 of the outer case 80, whereby the outer case 80 is attached to the main body case 20 via the seal ring 39a in an airtight fashion.

The check valve 90 is accommodated within the cylindrical member 30 so that the pressure within the fuel tank is adjusted. Referring also to FIG. 4(b), this check valve 90 includes mainly a casing 91 having through holes 91a, 91b formed in both upper and lower surfaces thereof, respectively, a valve element 93 that is disposed slidably within the casing 91 and that moves into contact with and apart from the upper through hole 91a, and a check valve spring 95 which biases the valve element 93 towards the upper through hole 91a. The check valve 90 is accommodated within the cylindrical member 30 so as to slide vertically and moves into contact with and apart from an upper circumferential edge of the vent hole 22a in the upper surface 22 of the main body case 20. A spring support recess portion 91c is formed in an upper surface of the casing 91 of the check valve 90.

Next, the function and advantage of the invention will be described.

Firstly, as shown in FIG. 2, the check valve 90 is accommodated in the check valve accommodating portion 31 which is defined by the cylindrical member 30, and a lower end of the spring 77 is placed on the spring support recess portion 91c formed in the upper surface of the casing 91. Then, the cap member 50 is disposed in the opening portion 33 of the cylindrical member 30 such that the back-side spring support recess portion 65 (refer to FIG. 3(c)) is placed on an upper end of the spring 77, such that the claw portions 73 of the engagement claw pieces 57 are aligned with the engagement holes 35, and such that the projecting pieces 61 are aligned with the cutout recess portions 36.

Then, as shown in FIGS. 4(a), (b), the distal end portion of the side wall 53 of the cap member 50 is inserted into the inner circumference of the opening portion 33 of the cylindrical member 30. As this occurs, since the outer circumference of the distal end portion of the side wall 53 of the cap member 50 is formed into the tapered surface 69, the distal end portion can be inserted easily into the inner circumference of the cylindrical member 30. In this state, the tapered outer surfaces 73a of the claw portions 73 of the engagement claw pieces 57 are brought into engagement with the inner circumferential edge of the opening portion 33, whereby the cap member 50 can be held temporarily in the cylindrical member 30.

Figure 5A:
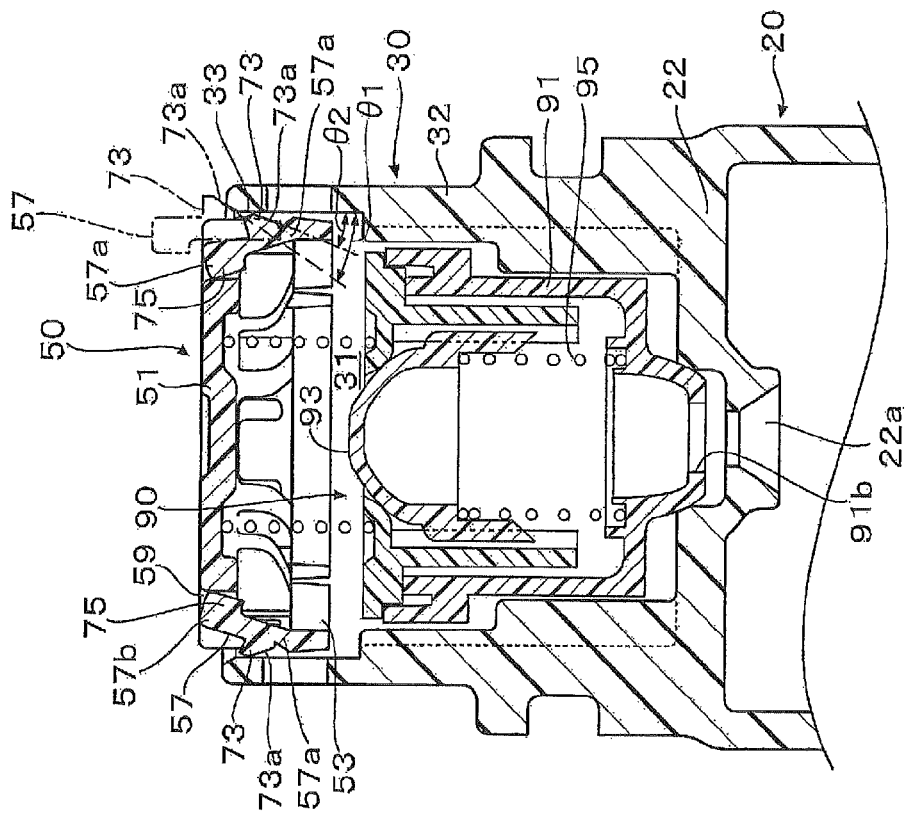
FIG. 5(a) is an enlarged sectional view of the main part showing a state in which the cap member is pushed into the cylindrical member using the cap attaching structure according to the invention.

When further pushing the cap member 50 into the cylindrical member 30 from the above-described state, the tapered outer surfaces 73a of the claw portions 73 are pressed on by the inner circumference of the cylindrical member 30, whereby the engagement claw pieces 57 are deflected inwards on the proximal end portions 57a as fulcrums as shown in FIG. 5(a). As this occurs, the abutment portions 75 which project from the inner circumferences of the distal end portions 57b of the engagement claw pieces 57 are brought into abutment with the cutout portions 59 in the end plate 51 of the cap member 50, whereby the engagement claw pieces 57 are restricted from being deflected further. In this embodiment, when the abutment portions 75 of the distal end portions 57b of the engagement claw pieces 57 are brought into abutment with the cutout portions 59 in the end plate 51, an upper end portion of the cylindrical member 30 is deflected outwards so that the engagement claw pieces 57 can pass therethrough.

Figure 6A:
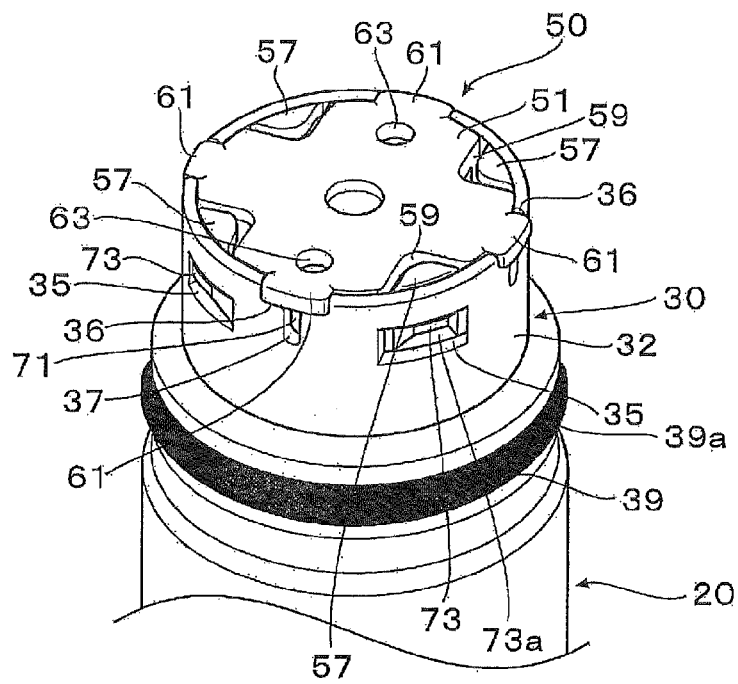
FIG. 6 shows a state in which the cap member is attached to an opening portion of the cylindrical member using the cap attaching structure according to the invention, in which (a) is an enlarged perspective view and (b) is an enlarged sectional view of the main part.
Figure 6B:
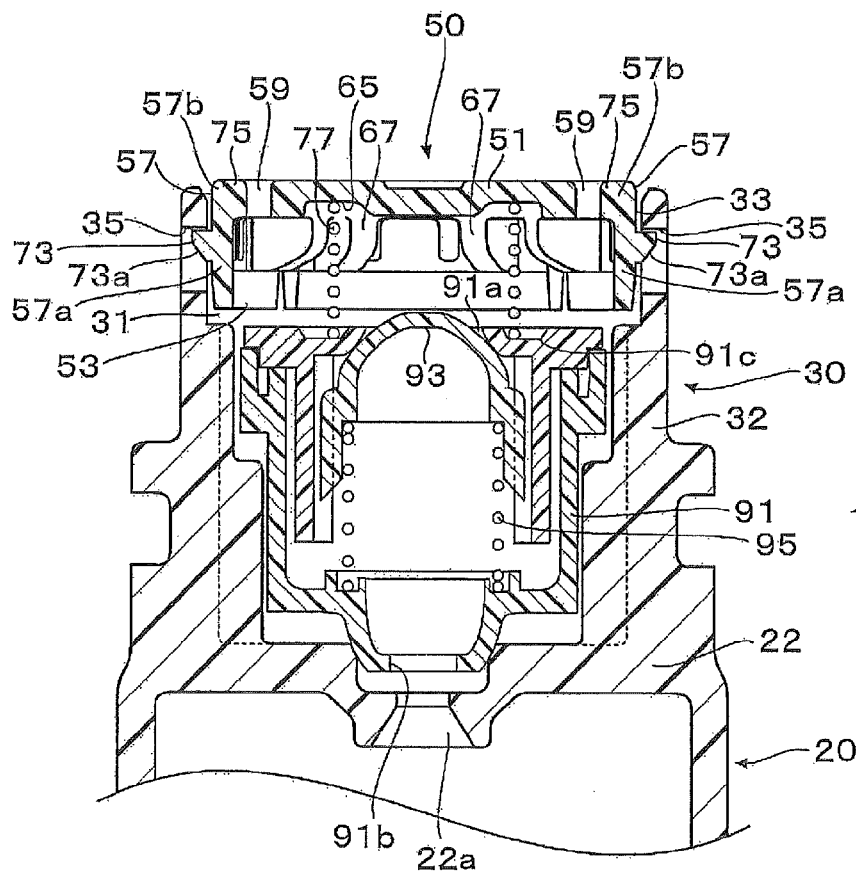

When the claw portions 73 reach the engagement holes 35, the engagement claw pieces 57 are elastically restored. Thus, as shown in FIGS. 6(a), (b), the cap member 50 is attached to the opening portion 33 of the cylindrical member 30 such that the claw portions 73 are brought into engagement with the respective engagement holes 35, such that the projecting pieces 61 fit in the respective cutout recess portions 36, and such that the notched grooves 71 are aligned with the notched grooves 37. As this occurs, the spring 77 is interposed between the lower surface of the cap member 50 and the upper surface of the check valve 90 while being compressed therebetween, whereby the check valve 90 is biased towards the vent hole 22a in the upper surface 22 of the main body case 20.

In this structure, during attaching of the cap member 50 to the cylindrical member 30, the cap member 50 can be held temporarily in the cylindrical member 30 without loosening and in a stable posture as shown in FIGS. 4(a), (b), and therefore, the cap member 50 can be pushed easily into the cylindrical member 30, thereby improving the attaching work of the cap member to the cylindrical member 30.

In this embodiment, when the cap member 50 is held temporarily in the cylindrical member 30, the projecting pieces 61 are aligned with the cutout recess portions 36, whereby the claw portions 73 of the engagement claw pieces 57 can be positioned accurately relative to the engagement holes 35 as shown in FIG. 4(a) so that the claw portions 73 are brought into firm engagement with the engagement holes 35 when the cap member 50 is pushed into the cylindrical member 30. When the cap member 50 is pushed into the cylindrical member 30, the claw portions 73 are brought into engagement with the respective engagement holes 35, whereas the projecting pieces 61 fit in the respective cutout recess portions 36. Thus, the relative rotation of the cap member 50 to the opening portion 33 of the cylindrical member 30 can be prevented.

The distal end portions 57b of the engagement claw pieces 57 extend to the positions corresponding to the cutout portions 59 in the end plate 51, and when the engagement claw pieces 57 are deflected inwards as shown in FIG. 5(a), the abutment portions 75 on the inner circumferences of the distal end portions 57b of the engagement claw pieces 57 are brought into abutment with the cutout portions 59 in the end plate 51, thereby restricting the deflection of the engagement claw pieces 57. Therefore, it is possible to prevent the failure of the engagement claw pieces 57.

In this structure, the insertion resistance of the cap member 50 against the cylindrical member 30 can be reduced. This aspect will be described with reference to FIGS. 5(a), (b).

Figure 5B:
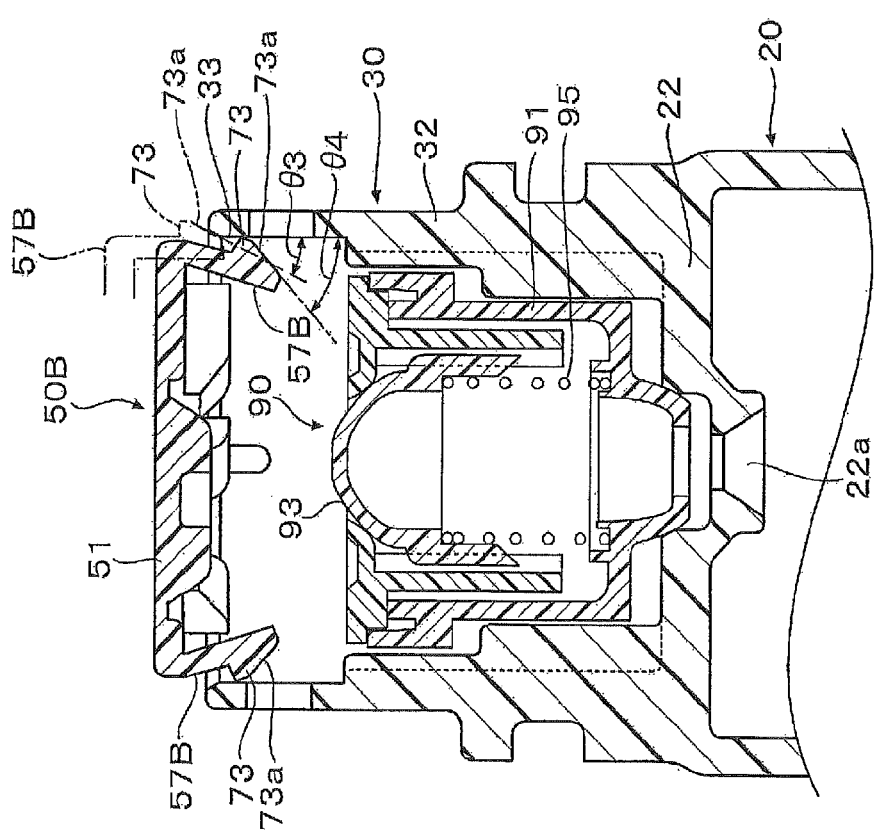
FIG. 5(b) is an enlarged sectional view of a main part of a comparison example.

Then, when assuming that an angle of an outer surface 73a of the claw portion 73 with respect to a circumferential wall 32 of a cylindrical member 30 when the claw portion 73 of the engagement claw piece 57B is in abutment with an inner circumference of an opening portion 33 of the cylindrical member 30 as indicated by imaginary lines shown in FIG. 5(B) is θ3, an angle θ4 of the outer surface 73a of the claw portion 73 with respect to the circumferential wall 32 of the cylindrical member 30 when the engagement claw pieces 57B are deflected by the cap member 50B being pushed into the cylindrical member 30 becomes larger than the angle θ3, whereby the insertion resistance of the cap member 50B is increased.

In contrast, according to the structure of the invention, when assuming that an angle of the outer surface 73a of the claw portion 73 with respect to the circumferential wall 32 of the cylindrical member 30 is θ1 when the claw portion 73 of the engagement claw piece 57 is in abutment with the inner circumference of the opening portion 33 of the cylindrical member 30 as indicated by imaginary lines shown in FIG. 5(a), an angle θ2 of the outer surface 73a of the claw portion 73 with respect to the circumferential wall 32 of the cylindrical member 30 when the engagement claw pieces 57 are deflected as a result of pushing the cap member 50 into the cylindrical member 30 becomes smaller than the angle θ1.

Namely, in this structure, when the cap member 50 is pushed into the cylindrical member 30 while the outer surfaces 73a of the claw portions 73 are into abutment with the inner circumference of the cylindrical member 30 and the engagement claw pieces 57 are deflected inwards on the proximal end portions 57a thereof as the fulcrums, since the angle of the outer surface 73a of the claw portion 73 with respect to the circumferential wall 32 of the cylindrical member 30 is decreased as the cap member 50 is pushed into the cylindrical member 30 as shown in FIG. 5(a), the insertion resistance of the cap member 50 can be decreased, thereby improving the attaching work of the cap member 50 to the cylindrical member 30.

When the engagement claw pieces 57 are deflected inwards, the angle of the outer surface 73a of the claw portion 73 with respect to the inner wall 32 of the cylindrical member 30 is decreased, whereby the insertion resistance can be decreased. Therefore, compared with the structure of Patent Literature 1 in which the engagement claw pieces are deflected on the proximal end portions thereof which are connected to the end plate as the fulcrums or the structure of Patent Literature 2 in which the outer circumference of the lid member is not deflected, the height of the claw portions 73 can be made relatively high. As a result, the engaging force of the cap member 50 to the cylindrical member 30 is increased, whereby the cap member 50 can be attached to the cylindrical member 30 strongly and rigidly.

The engagement holes 35 with which the claw portions 73 of the engagement claw pieces 57 are brought into engagement are formed in the circumferential wall 32 of the cylindrical member 30 so as to penetrate therethrough. Therefore, for example, an internal shape of the circumferential wall can be defined by a mold which slides along the axial direction of the circumferential wall 32, while an external shape of the circumferential wall 32 and the engagement holes 35 can be defined by a mold which slides along a direction which is at right angles to the axial direction of the circumferential wall 32. Thus, the forcibly removal of the mold as done in Patent Literature 2 is not necessary, whereby the engagement holes 35 can be formed accurately. As a result, the cap member 50 can be attached to the cylindrical member 30 with reduced loosening and in a stable fashion.

The check-valve-integrated cut valve 10 with the above-mentioned cap attaching structure will operate as follows.

In the check-valve-integrated cut valve 10 which is attached to the pump unit disposed in the fuel tank or is attached to the upper wall of the fuel tank, when the level of liquid fuel rises as a result of the vehicle turning, causing the float valve 45 to immersed in the liquid fuel to a predetermined height, the float valve 45 rises due to its buoyancy and a biasing force of the float valve spring 47, whereby the projection 46 at the center of the upper end of the float valve 45 is brought into abutment with the inner circumferential edge of the vent hole 22a in the upper surface 22 of the main body case 20 to thereby close the vent hole 22a, thereby preventing the leakage of liquid fuel from the fuel tank.

When the pressure within the fuel tank exceeds a predetermined value while the float valve 45 falls to open the vent hole 22a, the check valve 90 rises against the biasing force of the spring 77 to open the vent hole 22a, and evaporated fuel flows into the check valve accommodating portion 31 through the vent hole 22a. The evaporated fuel flows out to the outside of the check valve 90 after passing through, spaces between the guide ribs 38 of the cylindrical member 30, the slits 55, the cutout portions 59 and the through holes 63 of the cap member 50, and the notched grooves 37 in the cylindrical member 30 and the notched grooves 71 in the cap member 50 which are aligned to communicate with each other. Then, the evaporated fuel is sent to a canister, not shown, through the connection pipe 83 on the outer case 80, whereby the pressure within the fuel tank is decreased.

On the other hand, when a negative pressure of a predetermined value or larger relative to the atmospheric pressure is produced within the fuel tank, outside air is introduced through the connection pipe 83 on the outer case 80. The introduced air passes the check valve accommodating portion 31 through the slits 55, the cutout portions 59 and the through holes 63 of the cap member 50 and the notched grooves 37 and the notched grooves 71 which communicate with each other, whereby the valve element 93 is pressed on. As a result, the valve element 93 moves downward against the biasing force of the check value spring 95, whereby the through hole 91a in the check valve upper surface is opened, and the outside air flows into the fuel tank through the through hole 91b in the check valve lower surface and the vent hole 22a in the upper surface 22 of the main body case 20, whereby the negative pressure condition in the fuel tank is eliminated.

In this embodiment, by applying the cap attaching structure to the check-valve-integrated cut valve 10, the slits 55 and the cutout portions 59 of the cap member 50 function as flow paths when evaporated fuel within the fuel tank is released from the fuel tank or outside air is introduced into the fuel tank. Therefore, the flow rate of evaporated fuel or outside air can be increased, whereby the pressure in the fuel tank can be adjusted in a smooth fashion. By employing the cap attaching structure, the cap member 50 can be attached stably to the opening portion 33 of the cylindrical member 30 with reduced loosening and with increased accuracy. Therefore, the spring 77 which biases the check valve 90 can be positioned easily in the predetermined position so as to set the biasing force of the spring 77 with good accuracy, this contributing to a stable operation of the check valve 90.

In this embodiment, not only the slits 55 and the cutout portions 59, but also the through holes 63, the notched grooves 37 and the notched grooves 71 which are aligned to communicate with each other function as flow paths for evaporated fuel and outside air. Therefore, the flow rate thereof can be increased, whereby the pressure within the fuel tank can be adjusted more smoothly.

DESCRIPTION OF REFERENCE NUMERALS 10 check-valve-integrated cut valve; 20 main body case; 22 upper surface; 22a vent hole; 30 cylindrical member; 31 check valve accommodating portion; 32 circumferential wall; 33 opening portion; 35 engagement hole; 36 cutout recess portion; 37 notched groove; 50 cap member; 51 end plate; 53 side wall; 55 slit; 57 engagement claw piece; 57a proximal end portion; 57b distal end portion; 59 cutout portion; 61 projecting piece; 73 claw portion; 77 spring.

The invention claimed is:

1. A cap attaching structure including:
a cylindrical member; and
a cap member which is attached to an opening portion of the cylindrical member,
wherein the cylindrical member has an engagement hole in a circumferential wall at a position close to the opening portion thereof,
wherein the cap member includes:
an end plate which is disposed in the opening portion;
a side wall which extends from a circumferential edge of the end plate so as to be inserted into the cylindrical member; and
an engagement claw piece which has
a proximal end portion which is connected to an inserting side end portion of the side wall,
a distal end portion which extends from the proximal end portion towards the end plate via a slit formed in the end plate and the side wall so as to constitute a free end, and
a claw portion which is formed on an outer circumference of the engagement claw piece so as to be brought into engagement with the engagement hole of the cylindrical member, and
wherein the distal end portion of the engagement claw piece is disposed in a cutout portion in the end plate via the slit, so that a deflection of the engagement claw is restricted through an abutment with the cutout portion in the end plate.

2. The cap attaching structure of claim 1,
wherein the cylindrical member constitutes a cylindrical wall portion which defines a check valve accommodating portion of a check-valve-integrated cut valve, the check valve accommodating portion being provided continuously on an upper surface of a main body case, the main body case accommodating a float valve, and
wherein the cap member is attached to the cylindrical member so as to fasten one end of a spring which biases the check valve towards a vent hole formed in the upper surface.

3. The cap attaching structure of claim 1,
wherein a plurality of cutout recess portions are formed in an opening side circumferential edge of the cylindrical member, and
wherein a plurality of projecting pieces are provided on an outer circumference of the end plate of the cap member so as to fit in the plurality of cutout recess portions, respectively.

4. The cap attaching structure of claim 3,
wherein the cylindrical member constitutes a cylindrical wall portion which defines a check valve accommodating portion of a check-valve-integrated cut valve, the check valve accommodating portion being provided continuously on an upper surface of a main body case, the main body case accommodating a float valve, and
wherein the cap member is attached to the cylindrical member so as to fasten one end of a spring which biases the check valve towards a vent hole formed in the upper surface.

* * * * *